Figure 1:
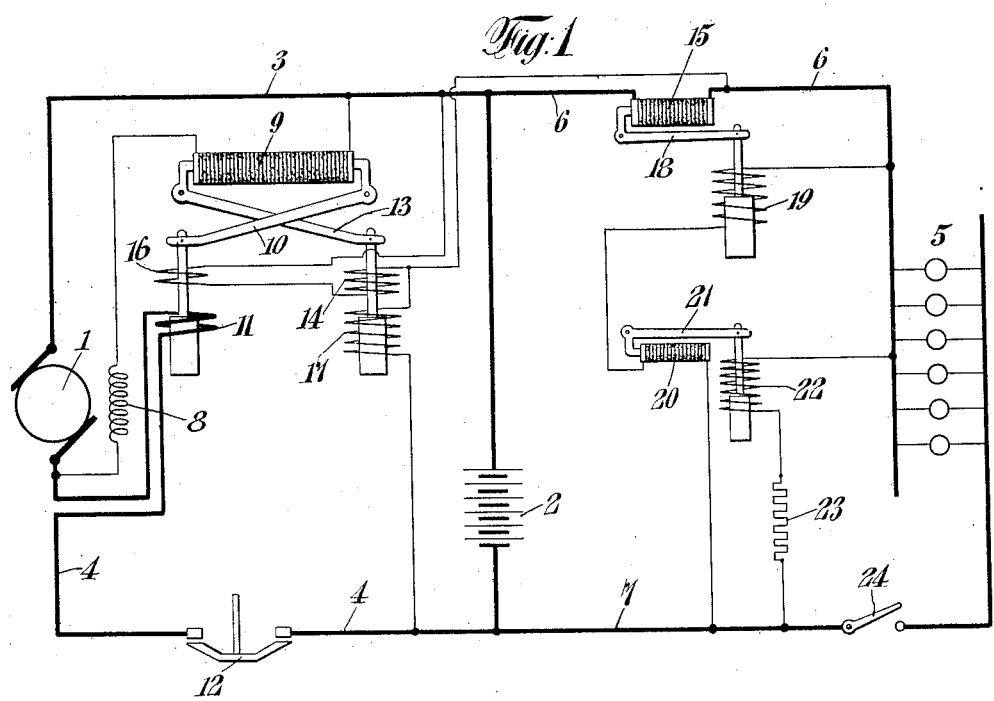

J. W. JEPSON.
ELECTRICAL SYSTEM OF DISTRIBUTION.
APPLICATION FILED AUG. 24, 1915.

1,260,386.

Patented Mar. 26, 1918.

INVENTOR
John W. Jepson
BY
Kenyon & Kenyon
ATTORNEYS

UNITED STATES PATENT OFFICE.

JOHN W. JEPSON, OF BUFFALO, NEW YORK, ASSIGNOR TO GOULD COUPLER COMPANY, A CORPORATION OF NEW YORK.

ELECTRICAL SYSTEM OF DISTRIBUTION.

1,260,386.  Specification of Letters Patent.  Patented Mar. 26, 1918.

Application filed August 24, 1915. Serial No. 47,027.

*To all whom it may concern:*

Be it known that I, JOHN W. JEPSON, a citizen of the United States, and a resident of Buffalo, county of Erie, State of New York, have invented certain new and useful Improvements in Electrical Systems of Distribution, of which the following is a specification.

My invention relates to electrical systems of distribution, more particularly to systems in which a generator, storage battery and work circuit are coöperatively employed, the generator feeding the work circuit and charging the storage battery when running, and the storage battery feeding the work circuit when the generator is not running, or is running at too low a speed. As an example it may be said that such general type of system is commonly employed for the electric lighting of railway cars.

In my applications for United States patents, Ser. Nos. 312,223 and 404,272, I have described a system in which a generator regulator is provided for regulating the voltage of the generator and also a work circuit regulator is provided for regulating the voltage provided the work circuit, the generator regulator being affected by the operation of the work circuit regulator. In the specific systems shown, the work circuit regulator comprises a variable resistance serially connected between the battery and work circuit, and the generator regulation is affected by means of a coil connected across the work circuit regulator, so that it is responsive to variations in voltage across the work circuit regulator, or variations in the drop of potential therein, and thus, as the battery becomes charged, the voltage coil acts through the generator regulator to limit the voltage of the generator. This arrangement forms an exceptionally efficient and delicate means for regulating the generator voltage, in order that it may be limited to a safe value and prevent the battery from becoming overcharged. It is subject, however, to one disadvantage, in that, when a heavy work circuit load is suddenly thrown on, there occurs a sudden abnormal increase in drop in potential across the work circuit regulator, which is apt to cause the generator regulation to be unduly affected. This is due to the fact that the work circuit regulator does not respond instantaneously to the changed conditions, so that the voltage across the work circuit is temporarily decreased, although normally maintained substantially constant.

This sudden throwing on and off of heavy loads on the work circuit thereby tends to cause a hunting action in the generator regulation.

The main object of my invention is to overcome this disadvantage and also to provide a simple and efficient system which is economical in construction and operation.

Further objects, features and advantages will more clearly appear from the detailed description given below, taken in connection with the accompanying sheet of drawings, which forms a part of this specification.

Figure 2:
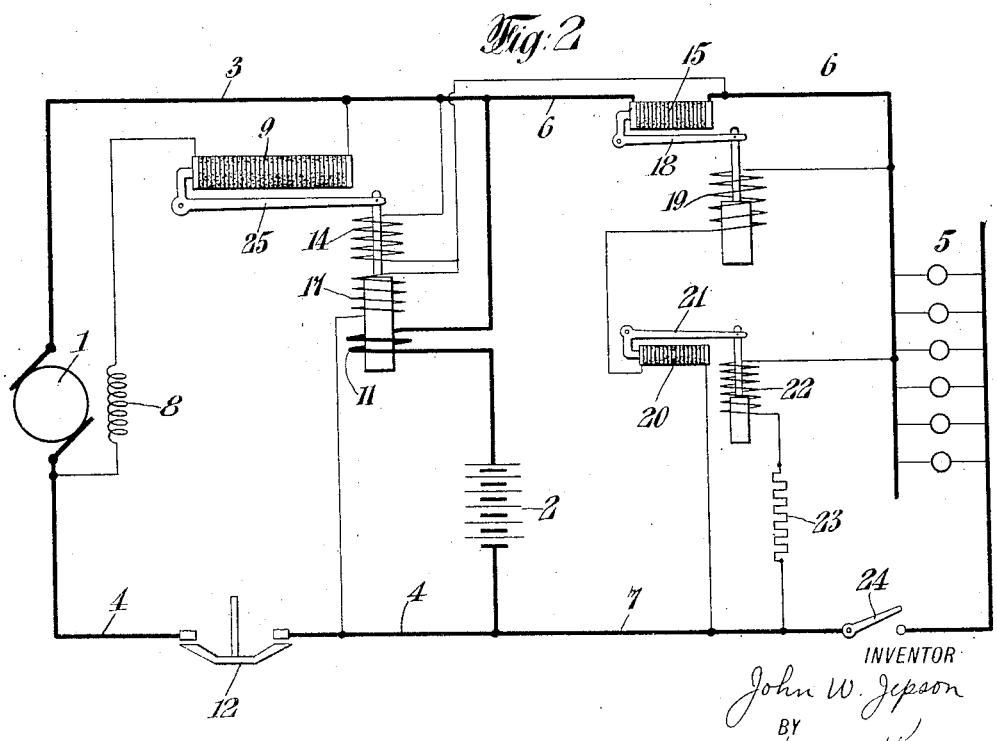

In the drawings, Figure 1 is a diagram illustrating a system embodying my improvements in one form. Fig. 2 is a diagram illustrating a modified form of system.

Referring to Fig. 1, 1 represents the generator which may be driven at variable speed, as from a car axle. 2 represents a storage battery connected to be fed by the generator through the mains 3 and 4. 5 represents a work circuit connected across the battery and generator, to be fed thereby, through the mains 6 and 7. 8 represents the generator shunt field windings, having in series therewith a carbon pile rheostat 9, with a lever 10, operating upon one end thereof, controlled by a solenoid, having a coil 11 serially connected between the generator and battery. 12 represents an automatic switch of any suitable kind, adapted to close the circuit between the generator and battery upon the generator voltage reaching a predetermined value. On the other end of the carbon pile 9 operates a lever 13, controlled by a solenoid having a coil 14 connected across the work circuit regulator, comprising a carbon pile 15 serially connected between the battery and work circuit 5. In series with the coil 14 is a coil 16 of a few turns, forming part of the same solenoid, which operates upon the lever 10 with the coil 11. 17 is a coil connected across the work circuit, so that it is responsive to voltage changes across the work circuit. Coil 17 forms part of the solenoid operating the lever 13 with the coil 14.

18 represents a lever operating the carbon pile variable resistance 15 and is controlled by a solenoid 19 connected across the work circuit, having in series therewith a small carbon pile 20, operated by a lever 21, controlled by a coil 22, connected across the work circuit and having in series therewith a resistance 23. 24 represents a switch by means of which the work circuit may be connected and disconnected.

When the generator has attained sufficient speed, the automatic switch 12 closes. The generator will then furnish current to the battery 2, or work circuit 5, or both. If the speed of the generator 1 is increased, its voltage will tend to increase, and consequently the output will tend to increase. In order that the output may be kept in safe limits, when the current flowing from the generator reaches the desired value, it acts through the coil 11 to raise the lever 10, thus increasing the resistance of rheostat 9 and weakening the field of the generator so as to keep down its voltage, and thus maintain the current output of the generator substantially constant. Part of the current flowing to the generator will feed the work circuit 5 and part will flow to the battery to charge the same. As the battery becomes charged, the voltage thereacross and across the generator will increase. This increase in voltage, however, is prevented from extending to the work circuit, by means of the work circuit regulator 15. Should the voltage across the work circuit tend to increase, the solenoid 22 will act to decrease the resistance of carbon pile 20, and thus considerably increase the strength of the coil 19, so that it will increase the resistance of rheostat 15 and maintain the voltage across the work circuit substantially constant. Any tendency for the voltage across the work circuit to decrease, will cause the reverse operation. It will therefore be seen that as the battery becomes charged, and the voltage across the battery and generator increases correspondingly, the voltage across the work circuit regulator 15 will increase in much greater proportion. When this voltage drop in the work circuit regulator has increased to the desired value, indicating that the battery has become substantially charged, the strength of coil 14 is sufficiently increased, so that lever 13 is raised, thereby increasing the resistance of carbon pile 9 and limiting the voltage of the generator 1, so that the battery charging current tapers off and the charging is substantially stopped. Normally, the strength of coil 17 is substantially constant, since it is connected across the work circuit, the voltage across which is maintained normally substantially constant, by the action of the work circuit regulator. However, if a large load is suddenly thrown on the work or lamp circuit 5, there occurs a sudden material increase in potential drop in the work circuit regulator, and consequently, a sudden drop in voltage across the work circuit. This acts to suddenly increase the strength of coil 14, at a time when it is not desired to affect the generator regulation. The work circuit regulator, however, promptly brings the voltage across the work circuit back to the desired value, but if it were not for the presence of the coil 17, this would not be accomplished before the sudden increase in voltage across the work circuit regulator had affected the generator regulation, producing a hunting action. The coil 17, however, acts as a balancing coil, and as the sudden increase in potential occurs across the work circuit regulator, thereby increasing the strength of the coil 14, a decrease in potential occurs across the work circuit, causing a decrease in strength of coil 17, so that the resultant effect on the generator is substantially *nil.* That is, the relative ampere turns of coils 14 and 17 are so proportioned that when there is a fluctuation of voltage on the translation circuit, it will not disturb the magnetic balance of the generator regulator. If desired, the voltage coils 14 and 17 may be so adjusted that they control the generator regulator throughout the major portion of the charging period, in which case the current solenoid comprising coils 11 and 16 would only affect the regulation when the battery would tend to take an abnormally large current at a relatively low voltage, as when it is in a very much discharged state.

The arrangement shown in Fig. 2 is substantially the same, except that instead of providing two solenoids operating on a carbon pile 9, through independent levers, carbon pile 9 is operated by a single lever 25, the coils 11, 17 and 14 being wound so as to form a single solenoid for operating this lever. In this instance, also the coil 11, instead of being connected so as to be responsive to changes in total generator current is connected to the battery circuit, so as to be responsive only to battery current changes. In Fig. 2 the coil 11 acts to regulate the generator, so as to limit the battery current and thus keep down the voltage to a safe value during the charging operation. When the battery becomes substantially charged, indicated by a material rise in voltage across the work circuit regulator 15, the strength of coil 14 is materially increased, thereby tending to keep down the generator voltage and reduce the battery charging current. The coils may also be adjusted so that the regulation throughout the major portion of the charging period is for constant potential, the coil 11 having few ampere turns and acting principally to limit the charging current when the battery is in a very much discharged state.

While I have described my invention in connection with particular systems and in great detail, nevertheless, I do not desire to be limited to the details shown and described, since my improvements may be applied to many other forms of regulations, and many changes and modifications may be made without departing from the spirit and scope of my invention in its broader aspects.

Having fully and clearly described my improvements what I claim as new and desire to secure by Letters Patent is:

1. In an electrical system of distribution, the combination of a generator, a storage battery and work circuit fed thereby, means for regulating the voltage applied to the work circuit and means for regulating the voltage of the generator comprising a magnet having a controlling coil connected across the work circuit regulating means, and a coil connected across the work circuit.

2. In an electrical system of distribution, the combination of a generator, a storage battery and work circuit fed thereby, a variable resistance serially connected for regulating the voltage applied to the work circuit, and means for regulating the generator voltage, including a coil responsive to voltage variations across said resistance and a coil connected across the work circuit acting to compensate for sudden changes in voltage across said resistance.

3. In an electrical system of distribution, the combination of a generator, a storage battery and work circuit fed thereby, a variable resistance serially connected for regulating the voltage applied to the work circuit, and means for regulating the generator voltage, including a coil responsive to voltage variations across said resistance to limit the generator voltage and a coil responsive to variations in voltage across the work circuit coöperating therewith.

4. In an electrical system of distribution, the combination of a generator, a storage battery and work circuit fed thereby, a variable resistance for regulating the voltage applied to the work circuit, a coil controlling said variable resistance responsive to voltage changes, and means for regulating the generator, including a coil responsive to variations in voltage across said variable resistance, and a coil responsive to variations in voltage across the work circuit.

5. In an electrical system of distribution, the combination of a generator, a storage battery and work circuit fed thereby, a variable resistance for regulating the voltage applied to the work circuit, a coil controlling said variable resistance responsive to voltage variations across the work circuit, and means for regulating the generator voltage including a coil connected across said variable resistance and a coil connected across the work circuit for compensating for sudden changes in voltage across said variable resistance.

6. In an electrical system of distribution, the combination of a generator, a storage battery and work circuit fed thereby, a work circuit regulator and a generator regulator, including a coil affected by the operation of the work circuit regulator and a coil affected by variations in voltage across the work circuit.

7. In an electrical system of distribution, the combination of a generator, a storage battery and work circuit fed thereby, a work circuit regulator and a generator regulator, including a coil affected by the operation of the work circuit regulator to limit the voltage of the generator, and a coil affected by variations in voltage across the work circuit compensating for sudden changes in voltage across the work circuit.

8. In an electrical system of distribution, the combination of a generator, a storage battery and work circuit fed thereby, a work circuit regulator for maintaining the voltage across the work circuit substantially constant, and a generator regulator affected by the operation of the work circuit regulator for limiting the voltage of the generator and means whereby the generator regulator is also affected by changes in voltage across the work circuit.

9. In an electrical system of distribution, the combination of a generator, a storage battery and work circuit fed thereby, a work circuit regulator for maintaining the voltage across the work circuit substantially constant, and a generator regulator affected by variations in voltage across the work circuit regulator for limiting the voltage of the generator and means whereby the generator is also affected by variations in voltage across the work circuit to compensate for sudden changes in voltage across the work circuit.

10. In an electrical system of distribution, the combination of a generator, a storage battery and work circuit fed thereby, a work circuit regulator and a generator regulator, including a coil affected by the operation of the work circuit regulator and a coil affected by variations in voltage across the work circuit, and means for limiting the current output of the generator.

11. In an electrical system of distribution, the combination of a generator, a storage battery and work circuit fed thereby, a variable resistance serially connected between the battery and work circuit for maintaining the voltage across the work circuit substantially constant, and means for regulating the generator voltage including a coil responsive to changes in the voltage drop in said resistance and a coil responsive to changes in voltage across the work circuit coöperating with said first coil to prevent hunting.

12. In an electrical system of distribution, the combination of a generator, a storage battery and work circuit fed thereby, means for regulating the voltage applied to the work circuit and means for regulating the voltage of the generator comprising a magnet having a controlling coil connected across the work circuit regulating means, and a coil connected across the work circuit, and means for limiting the generator current flowing to the battery.

13. In an electrical system of distribution, the combination of a generator, a storage battery and work circuit fed thereby, a variable resistance serially connected between the battery and work circuit for maintaining the voltage across the work circuit substantially constant, and means for regulating the generator voltage including a coil responsive to changes in the voltage drop in said resistance and a coil responsive to changes in voltage across the work circuit coöperating with said first coil to prevent hunting, and a coil serially connected between the generator and battery, acting to tend to limit the current flowing therethrough.

In testimony whereof, I have signed my name to this specification.

JOHN W. JEPSON.

Copies of this patent may be obtained for five cents each, by addressing the "Commissioner of Patents, Washington, D. C."